INVENTOR
BENJAMIN W. BARLOW

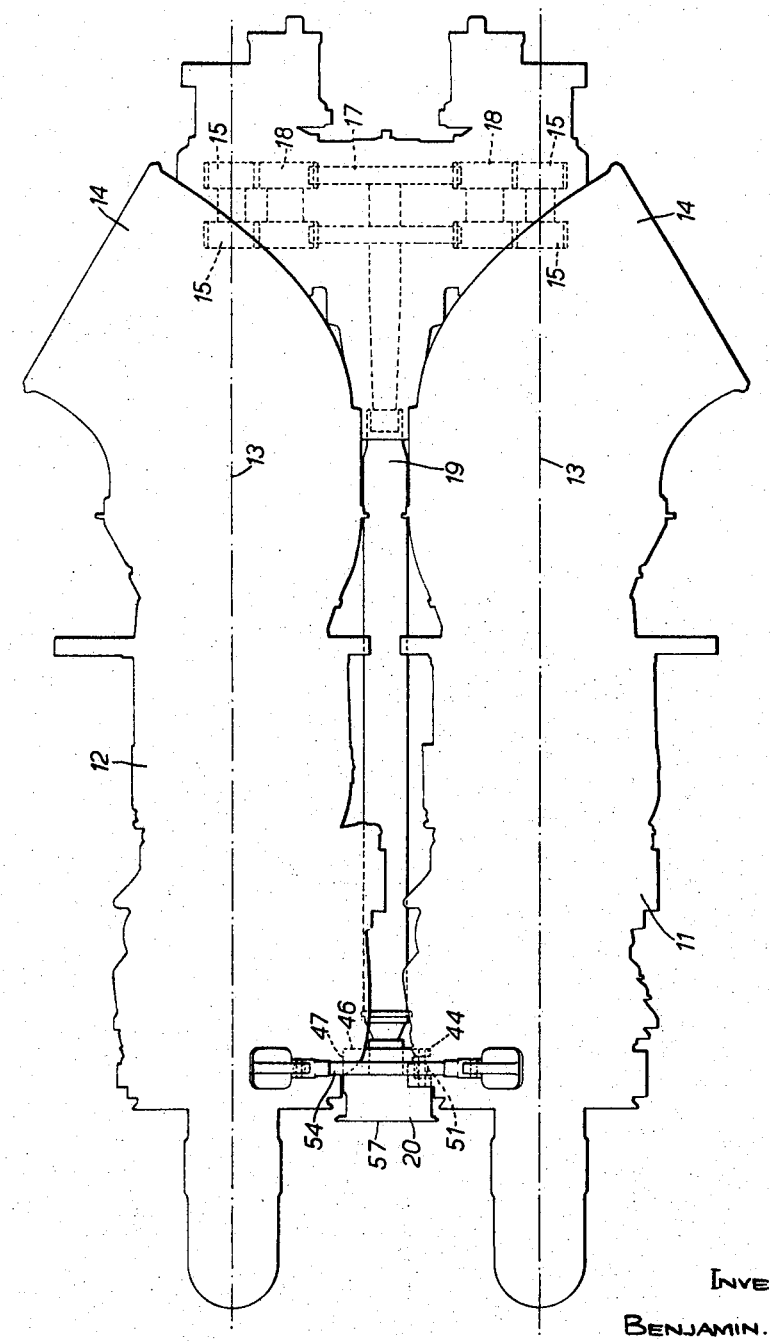

INVENTOR
BENJAMIN W. BARLOW

United States Patent Office 3,420,057
Patented Jan. 7, 1969

3,420,057
ENGINE DRIVE
Benjamin William Barlow, Harrow Weald, Middlesex, England, assignor to Bristol Siddeley Engines Limited, Bristol, England
Filed Mar. 29, 1966, Ser. No. 538,280
Claims priority, application Great Britain, Mar. 30, 1965, 13,460/65
U.S. Cl. 60—39.32          13 Claims
Int. Cl. F02g 3/00; F02c 7/20; F16m 1/02

ABSTRACT OF THE DISCLOSURE

This invention relates to a mounting for engines in an aircraft in which two engines drive a common shaft through a common gearbox. In order to simplify the mounting arrangements and to provide for the minimum possible number of flexible joints so as to restrict the freedom of movement to the minimum necessary, one engine and the gearbox casing are mounted as a rigid assembly rigidly from the frame of the aircraft while the other engine is mounted from this rigid assembly through joints permitting some freedom of angular movement.

---

This invention relates to a particular kind of engine drive in which a pair of engines drive a common output shaft. For example the invention is applicable to an arrangement in which the engines are in an aircraft placed side by side in the fuselage or in the wings near the fuselage driving the common output shaft through a gear meshing with two gears, one on each of the engine shafts. Such an arrangement could include a free wheel between each engine shaft and the common output shaft if necessary. The engines could conveniently be gas turbine engines.

The invention is for a particular method of mounting the drive giving flexibility both in construction and operation.

According to the present invention in an engine drive in which two engines drive a common output shaft, one engine is rigidly mounted and the other engine is mounted from the one engine through joints permitting some freedom of angular movement.

One engine may be in a rigid assembly with the casing of a common gear box through which the two engines drive the output shaft—preferably a gear box at the rear end.

The one engine may be mounted, for example, from an aircraft fuselage, through a three point suspension and then the mounting of the other engine will permit some movement in consequence of vibrations, temperature changes, or other deformation.

In a preferred form of the invention the said other engine is mounted on three pivotal joints one at the end of a tie rod carrying weight and torsion between the two engines and the others, one at each of two universal joints respectively at the front and rear of the engine. The universal joints are conveniently incorporated in a bearing housing for a shaft from the rear of the other engine and a bearing housing for the common drive shaft mounted between the two engines at the front.

Either or both engines may include a torque meter between its drive and the common shaft.

In a preferred arrangement the drives from the engines are at the rear and the common output shaft extends forwardly between the engines to a drive for example an air screw or a helicopter rotor in the case of an aircraft. In the case of a helicopter a rotor can be driven through a drive taken from the common output shaft through an appropriate arrangement of gearing, for example a train of spur gears extending from the output shaft to a rearwardly extending shaft driving a tail rotor.

The invention may be carried into practice in various ways and one embodiment will now be described by way of example with reference to the accompanying drawings, in which:

FIGURE 3 is a plan corresponding to FIGURES 1 and 2,

FIGURE 4 is a sectional detail to an increased scale of a part of FIGURE 3,

Figure 1:
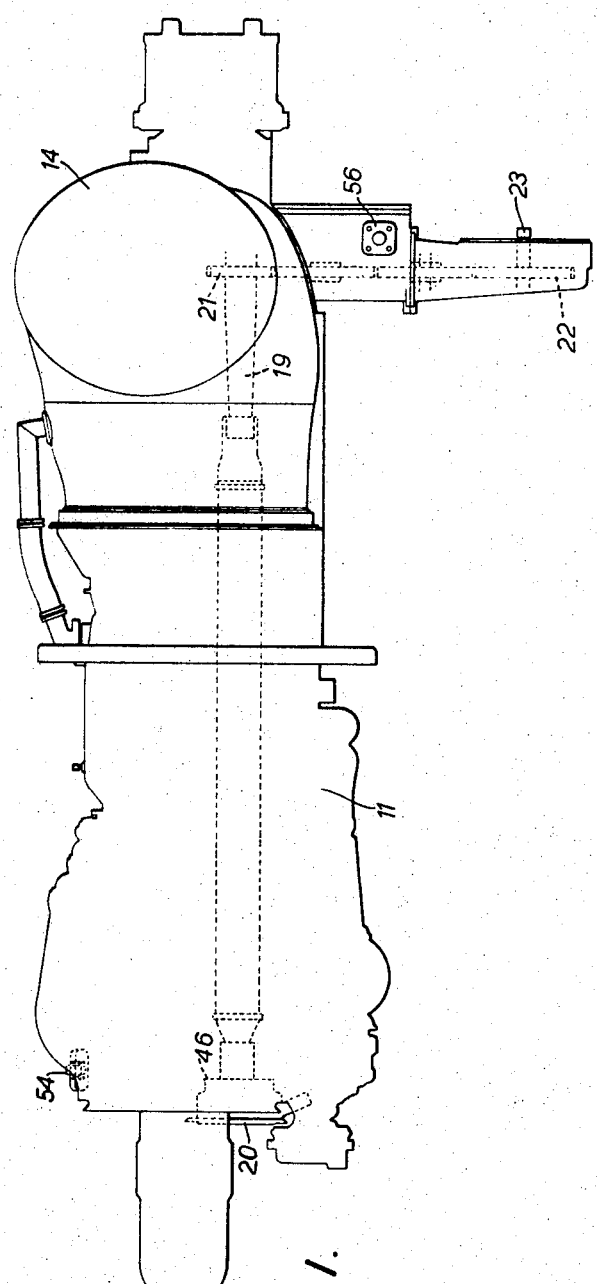
FIGURE 1 is a side elevation showing the general lay out of the drive.

A helicopter rotor is driven from two gas turbine engines 11 and 12 mounted side by side in the fuselage with their axes parallel with the fuselage axis. The engines have compressors drawing in air at the front in which fuel is burnt, and the products of combustion drive the turbines before passing through rearwardly and outwardly directed duct 14. The turbines provide shaft power on rearwardly directed shafts 13.

As shown in FIGURE 3 the drive shafts 13 drive spur gears 15 through free wheel clutches 16 and the two spur gears 15, one from each engine drive shaft, drive a common spur gear 17, each through an intermediate spur gear 18.

The arrangement of spur gears 15, 17, and 18 provides speed reduction and also serves to combine the drives from both engine shafts 13 to a common output shaft 19 extending forwardly over and between the engines 11 and 12 to a coupling 20 at the forward end from which the drive is continued forward through a flexible coupling to a rotor gear box which provides a drive to a rotor not shown, in which gear box further speed reduction is achieved.

There is also a drive to a horizontal axis tail rotor and this is obtained from a gear 21 mounted on the final drive shaft 19 through a series of spur gears in a vertical arrangement as shown best in FIGURE 1. The output is taken from the lowermost gear 22 in the series on a shaft 25 extending horizontally reawardly to the tail rotor.

The invention is particularly concerned with the method of mounting the drive and transmission and in order to make this clear some parts of the transmission will be described in rather greater detail.

Figure 4A:
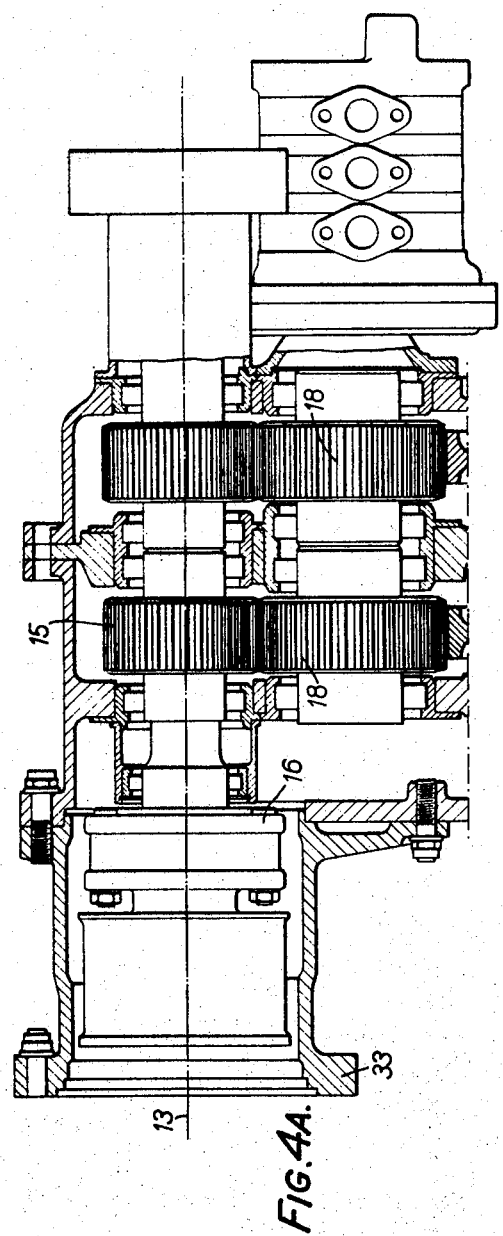
FIGURE 4a is a transverse section along line 13 of FIGURE 3.
Figure 4B:
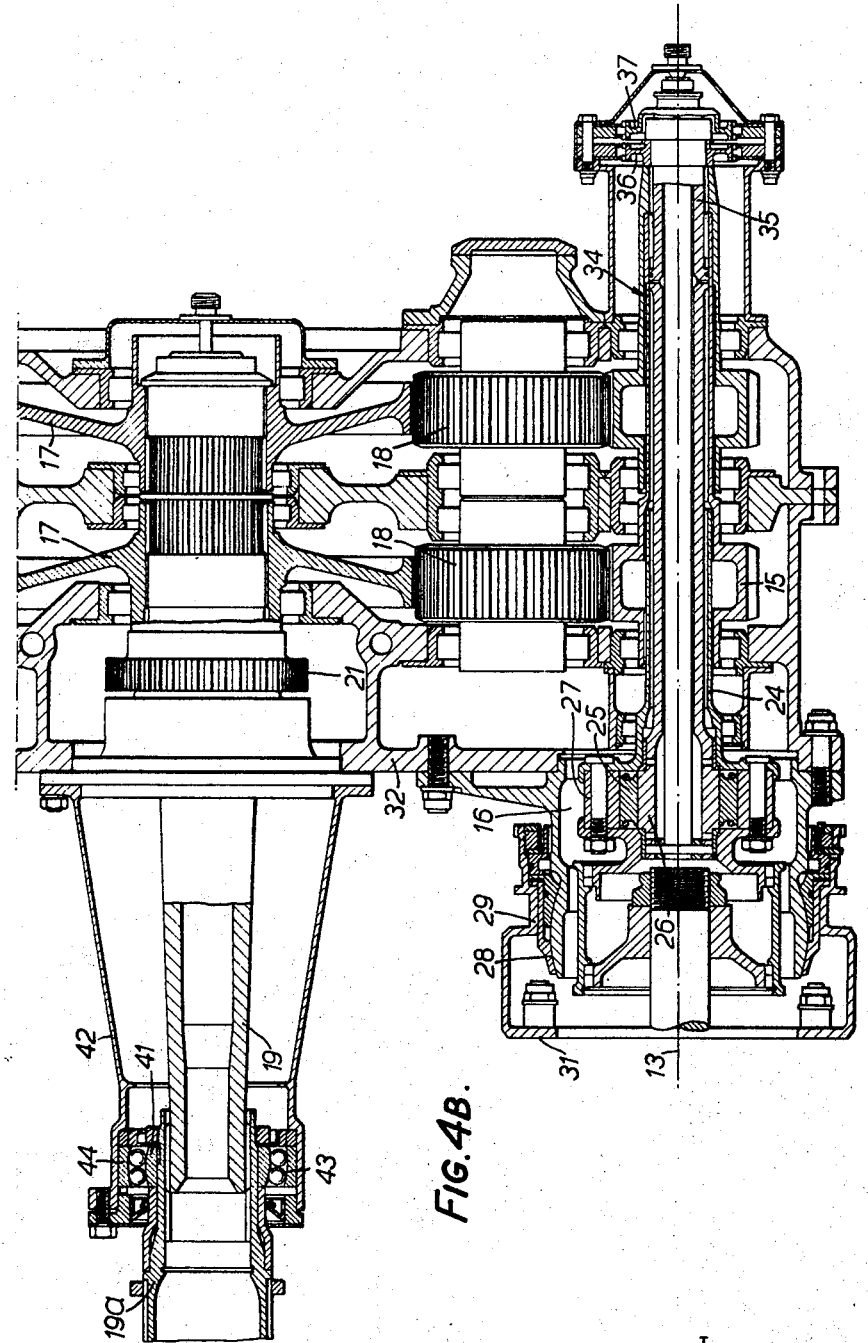
FIGURE 4b is a transverse section in the same plane as FIGURE 4a, but showing in detail the portion of the device which connects the engines to the central drive shaft.

FIGURE 4 shows in detail the drive from the shaft 13 and the engine 11 to the intermediate spur gear 18 in the reduction gear box.

The free wheel arrangement 16 may be conventional and is such that if the engine 11 fails and the final drive gear 17 is driven only from the engine 12 then the shaft 24 carrying the spur gear 15 can free wheel on the drive shaft 13 of the engine 11. The free wheel shown has a number of pivotally mounted sprags 25 acting between inner and outer clutch members 26 and 27. When drive is from the engine 11 to the outer member 27, the sprags take up a wedging position holding the members 26 and 27 together but if the inner member 26 connected to the shaft 24 tends to overtake the shaft 13 the sprags swing into a position allowing free movement between the members 26 and 27.

The housing of the free wheel 16 is spherically mounted as shown at 28 in a bearing member 29 secured at 31 to the engine 11. The casing of the reduction gear box shown generally at 32 in FIGURE 4 is secured to the housing of the free wheel 16 to permit relative pivoting between the engine 11 and the gear box casing 32 at the mounting 28.

The shaft 13 from the engine 12 drives its spur gear 15 through a similar free wheel 16 but there is no pivoting bearing 28 and 29 as with the drive from the engine 11. Thus the gear box casing 32 is directly connected to the engine 12 at 33.

The drive to the spur gear 15 includes a torque meter which is the subject of British patent specification No. 968,503 (Case 116). The drive shaft 24 from the free wheel 16 carrying the spur gear 15 surrounds a tubular shaft 35 which extends rearwardly concentrically within a rearward extension 34 of the shaft 24. The two rearwardly extending shafts 34 and 35 carry respectively facing discs 36 and 37.

As described in patent specification No. 968,503 the angular deflection of the disc 36 in relation to its driven end (left hand end in FIGURE 4) will depend upon the torque transmitted between the free wheel 16 and the spur gear 15 whereas the inner shaft 35 which does not transmit torque will not deflect its disc 37 in relation to its left hand end. In consequence the relative angular displacement between the discs 37 and 36 will be an indication of the torque transmitted by the shaft 24 and this can be indicated by an electrical method for example as described in patent specification No. 968,503.

In fact the spur gears 15, 17 and 18, are in side by side pairs in order to share the load but only the set has been described in any detail.

The forwardly extending final drive shaft 19 from the gear 17 carries the spur gear 21 described above for driving the tail rotor and it extends through a journal bearing 41 held in a casing 42 surrounding the shaft 19 and connected to the gear box casing 32.

This bearing 41 is a self-centering or pivoting bearing consisting of pairs of balls 43 which run in an outer race 44 of curved form permitting some angular movement of the shaft 19 in relation to the casing 32.

Figure 5:
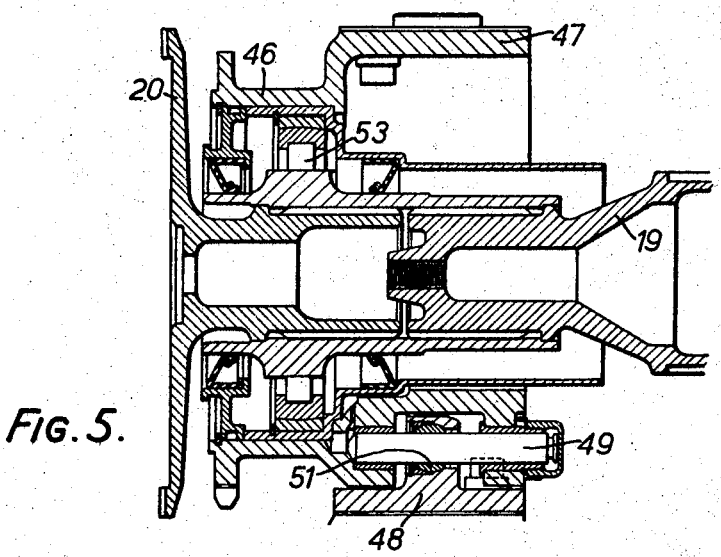
FIGURE 5 is a view similar to FIGURE 4 of the mounting at the front end of the final drive shaft.

At the forward end as shown in FIGURE 5, the shaft 19 runs in a journal bearing in a housing 46 which is in fact carried between the casings of the two engines 11 and 12 near their forward end.

Thus the housing 46 has an integral mounting flange 47 which is secured to the casing of the engine 12. A similar flange 48 secured to the engine 11 is coupled to the housing 46 through a connection permitting some freedom of angular movement.

The flange 48 has an internal lug which can turn on a pin 49 held in the housing 46 and directed parallel with the axis of the shaft 19, and in fact the lug on the flange 48 is mounted on the member which can turn on the pin 49 through a spherical connection shown generally at 51 so that there is limited freedom of angular movement in all directions between the housing 46 and the casing of the engine 11.

Moreover the journal bearing for the shaft 19 in the housing 46 is a spherical roller bearing 53 permitting some angular movement of the shaft in relation to the housing and some longitudinal sliding on the roller under thermal expansion or contraction.

Figure 2:
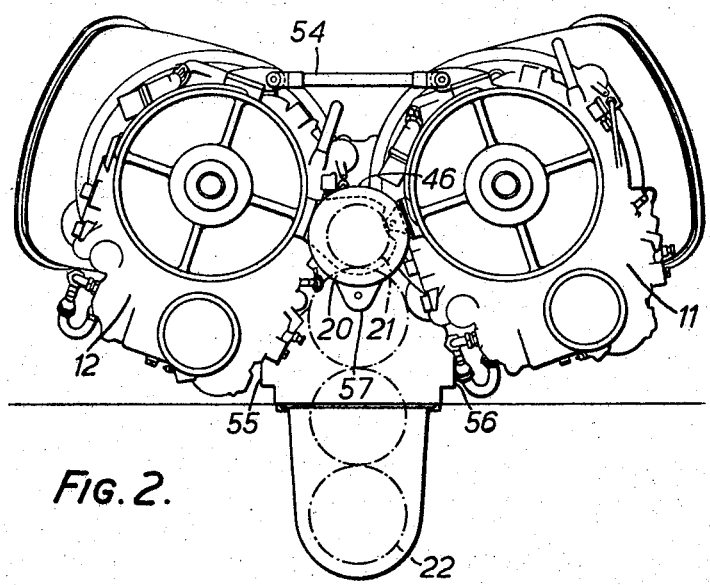
FIGURE 2 is a front elevation corresponding to FIGURE 1.

There is also a tie rod 54 pivotally connected between the engines as shown in FIGURES 1, 2 and 3.

The assembly of engines and gear box 32 and shafts is mounted from the aircraft at three suspension points 55, 56, and 57, one at each side of the gear box casing 32 and the other at the housing 46 connected between the engines at the front.

It will be seen that the engine 12 and the gear box casing 32 from a rigid assembly rigidly held in the aircraft whereas the engine 11 is supported from this assembly through members 49, 51, 54, 28 permitting some freedom of movement. Moreover, linear and angular movement of the shaft 19 can be accommodated by the members 53 and 44.

What I claim as my invention and desire to secure by Letters Patent is:

1. An engine drive including a support, two engines, a common output shaft for being driven by both engines at one time, means for rigidly mounting an assembly including one engine from the support, and flexible mounting means including joints permitting freedom of angular movement without affecting the connection between the engine and the output shaft for mounting the other engine from the one engine assembly, the other engine being mounted from the support solely through the assembly.

2. An engine drive as claimed in claim 1 including a common gearbox having a casing, two inputs to the gearbox, one from each engine, and an output from the gearbox to the output shaft, the said one engine being rigidly assembled with the gearbox casing which forms a part of the said assembly.

3. An engine drive including a support, two engines, a common output shaft driven by both engines, means for rigidly mounting an assembly including one engine from the support, and means including joints permitting freedom of angular movement for mounting the other engine from the one engine assembly, the other engine being mounted from the support solely through the assembly, the means for rigidly mounting the assembly comprising a three point suspension.

4. An engine drive including a support, two engines, a common output shaft driven by both engines, means for rigidly mounting an assembly including one engine from the support, and means including joints permitting freedom of angular movement for mounting the other engine from the one engine assembly, the other engine being mounted from the support solely through the assembly, the means for mounting the said other engine comprising a tie rod carrying weight and torsion between the two engines and two universal joints respectively at the front and rear of the said other engine, and three pivotal joints, one at the end of the tie rod and the other at the two universal joints.

5. An engine drive as claimed in claim 4 in which a bearing housing for a drive shaft incorporates one of the universal joints.

6. An engine drive as claimed in claim 5 in which one universal joint is in a bearing housing for a shaft from the rear of the said other engine.

7. An engine drive as claimed in claim 6 in which one universal joint is in a bearing housing for the common output shaft and mounted between the two engines at the front.

8. An engine drive including a support, two engines, a common output shaft driven by both engines, means for rigidly mounting an assembly including one engine from the support, means including joints permitting freedom of angular movement for mounting the other engine from the one engine assembly, the other engine being mounted from the support solely through the assembly, and a torque meter between the drive from one engine and the common shaft.

9. An engine drive including a support, two engines, a common output shaft driven by both engines, means for rigidly mounting an assembly including one engine from the support, and means including joints permitting freedom of angular movement for mounting the other engine from the one engine assembly, the other engine being mounted from the support solely through the assembly, the drives from the engine being at the rear and the common output shaft extending forwardly between the engines for driving a load.

10. An engine drive including a support, two engines, a common output shaft driven by both engines, means for rigidly mounting an assembly including one engine from the support, and means including joints permitting freedom of angular movement for mounting the other engine from the one engine assembly, the other engine being mounted from the support solely through the assembly, the engine drive being mounted in an aircraft with the common output shaft driving a rotor.

11. An engine drive as claimed in claim 10 with the common output shaft driving a helicopter rotor including a drive to a tail rotor taken from the common output shaft through a rearwardly extending shaft.

12. An engine drive as claimed in claim 11 in which the drive to the tail rotor includes a train of spur gears from the output shaft to the rearwardly extending shaft.

13. An engine drive as claimed in claim 12 in which the train of spur gears is located in the common gearbox which is at the rear of the engines.

References Cited

UNITED STATES PATENTS

| | | | |
|---|---|---|---|
| 1,960,965 | 5/1934 | Chandler et al. | 74—8 |
| 2,609,707 | 9/1952 | Marchant | 74—661 |
| 2,732,189 | 1/1956 | Gerst | 308—72 XR |
| 2,828,607 | 4/1958 | Johnson | 248—5 XR |
| 2,832,201 | 4/1958 | Alexander | 244—54 XR |
| 3,002,710 | 10/1961 | Marchetti et al. | 170—135.75 |
| 3,006,587 | 10/1961 | Jumelle et al. | 248—5 |
| 3,135,487 | 6/1964 | Kottsieper | 248—5 |

FOREIGN PATENTS

| | | |
|---|---|---|
| 250,559 | 8/1925 | Italy. |
| 171,711 | 11/1965 | U.S.S.R. |
| 1,030,521 | 5/1966 | Great Britain. |

DONLEY J. STOCKING, *Primary Examiner.*

T. R. HAMPSHIRE, *Assistant Examiner.*

U.S. Cl. X.R.

74—665; 248—5; 170—135.75; 244—54